(12) United States Patent
Franco et al.

(10) Patent No.: US 7,934,433 B1
(45) Date of Patent: May 3, 2011

(54) INVERSE VENTURI METER WITH INSERT CAPABILITY

(75) Inventors: Juan P. Franco, Houston, TX (US); Kanti D. Lad, Sugar Land, TX (US)

(73) Assignee: Baker Hughes Incorporated, Houston, TX (US)

( * ) Notice: Subject to any disclaimer, the term of this patent is extended or adjusted under 35 U.S.C. 154(b) by 0 days.

(21) Appl. No.: 12/612,458

(22) Filed: Nov. 4, 2009

(51) Int. Cl.
G01F 1/44 (2006.01)
(52) U.S. Cl. .................................................. 73/861.63
(58) Field of Classification Search ............... 73/861.63, 73/195–197, 61.41, 152.21, 152.18, 152
See application file for complete search history.

(56) References Cited

U.S. PATENT DOCUMENTS

| | | | |
|---|---|---|---|
| 2,297,003 | A | 9/1942 | Larson |
| 4,183,722 | A | 1/1980 | Roeder |
| 4,293,283 | A | 10/1981 | Roeder |
| 4,390,061 | A | 6/1983 | Short |
| 4,648,455 | A | 3/1987 | Luke |
| 4,660,647 | A | 4/1987 | Richart |
| 4,941,951 | A * | 7/1990 | Sheppard et al. ............... 175/48 |
| 5,128,052 | A | 7/1992 | Bullock |
| 5,141,055 | A | 8/1992 | Chien et al. |
| 5,718,287 | A | 2/1998 | Streich et al. |
| 5,743,717 | A | 4/1998 | Schmidt |
| 5,785,124 | A | 7/1998 | Hisaw et al. |
| 5,887,657 | A | 3/1999 | Bussear et al. |
| 6,015,018 | A | 1/2000 | Gazewood |
| 6,250,389 | B1 | 6/2001 | Sudol |
| 6,343,653 | B1 | 2/2002 | Mason et al. |
| 6,422,312 | B1 | 7/2002 | Delatorre et al. |
| 6,543,534 | B2 | 4/2003 | Erick |
| 6,568,473 | B2 | 5/2003 | de Almeida |
| 6,629,564 | B1 | 10/2003 | Ramakrishnan et al. |
| 6,799,634 | B2 | 10/2004 | Hartog et al. |
| 6,915,707 | B2 | 7/2005 | Nyfors et al. |
| 7,086,294 | B2 * | 8/2006 | DeLong ...................... 73/861.63 |
| 7,707,897 | B2 * | 5/2010 | Ong ........................... 73/861.04 |
| 2002/0029888 | A1 | 3/2002 | Swensen |
| 2006/0131014 | A1 | 6/2006 | Huang et al. |
| 2007/0193752 | A1 | 8/2007 | Kim |

FOREIGN PATENT DOCUMENTS

CA 2297003 A1 2/1999

OTHER PUBLICATIONS

Griston, Suzanne et al "Field Test of Tapered-Bore Chokes for Steam Flow Control" SPE 35677 (1996).

(Continued)

*Primary Examiner* — Jewel Thompson
(74) *Attorney, Agent, or Firm* — Steve Rosenblatt

(57) ABSTRACT

An insert meter can be run into an inverse venturi on wireline and make use of the existing pressure taps to allow accurate measurement of reduced flow rates that could not be accurately measured with the inverse venturi meter. The insert meter has seals and can lock into position with peripheral sealing to direct the new and lower flow rate into the throat of the insert meter that is preferably a standard venturi. The venturi devices can be in meter or eductor service and located downhole, subsea or on the surface.

20 Claims, 1 Drawing Sheet

OTHER PUBLICATIONS

Al Araimi, N.M. et al "Exploration Well Testing With a Venturi/Dual Energy Gamma Ray Multiphase Flow Meter—A Case Study From Oman" SPE 93288 (2005).

Al Taweel et al "Wellsite Wet Gas Measurement System in Saudi Arabia" SPE 49162 (1998).

Williamson, J.R. et al "An Infinitely Variable Choke for Multi-Zone Intelligent Well Completions" SPE 64280 (2000).

Dolle, N. et al "Combining Testing-by-Difference, Geochemical Fingerprinting, and Data-Driven Models: An Integrated Solution to Production Allocation in a Long Subsea Tieback" SPE 108957 (2007).

Tibold, M.P. et al "Well Testing with a Permanent Monitoring System" SPE 63079 (2000).

Ong, J.T. et al "Inverted Venturi: Optimizing Recovery Through Flow Measurement" SPE 110319 (2007).

* cited by examiner

INVERSE VENTURI METER WITH INSERT CAPABILITY

FIELD OF THE INVENTION

The field of the invention is venturi meters used in conjunction with flow from subterranean formations and more particularly inverse venturi meters that can accept an insert for measuring lower flows than the inverse venturi as production from a formation trails off. Surface and subsea applications are contemplated.

BACKGROUND OF THE INVENTION

Inverse venturi meters have been used to measure very high flows. They are essentially a bulge in the tubular string with associated pressure taps as illustrated in U.S. Pat. No. 6,915,707 FIG. 6. FIG. 5 in that patent illustrates the classical shape of a standard venturi that tapers down to a throat dimension where one of the pressure taps is located while the other pressure tap is at an end of the venturi in the larger dimension. With the inverse flow meter there is also an end tap and one in the enlarged portion.

Well productivity varies with time and when a high producing well starts to trail off in production the measurement equipment designed for high flow ceases to be accurate or function at all primarily because there is no longer a sufficient differential pressure in an inverse venturi at the new and significantly lower flow rates. When that happened in the past the meter had to be pulled out and replaced by another meter to handle the lower flow rates. The replacement meter was frequently a standard venturi. Pulling out the production string and running in a new meter also takes time and has associated costs for running back in with the new meter but production that is interrupted and the risk of a lower rate when production is resumed due to the interruption in production for the replacement meter installation. These issues can also affect other types of installations where there is a dramatic change in flow rates that requires meter replacement in a subterranean location.

Venturi meters can also be located in surface lines for production or subsea. Venturi device are known to also be used as eductors to stimulate flow such as in gas lift applications. The present invention has application to the various applications for venturi devices regardless of their location and the manner in which the insert is deployed.

Venturi meters are generally described in USP and US Publication Numbers: U.S. Pat. Nos. 5,743,717; 5,128,052; 4,293,283; 6,015,018; 6,629,564; 2006/0131014; 2002/0029888. Also of interest is Canadian Application 2,297,003. Insert safety valves are run downhole into an existing housing to take over the function of another safety valve already downhole as illustrated in U.S. Pat. No. 4,660,647.

The present invention addresses the problem by running in an insert flow meter into an inverse venturi meter and securing it in position to use the taps from the initial meter. The insert meter is preferably a standard venturi that is rapidly deployed on wireline and latched into position in a manner that will direct all flow through its throat while having access to the taps of the original meter to take data or transmit signals in the way the original meter did it before. In a subsea application a remotely operated vehicle can be used to remove a pipe segment next to the venturi and insert the insert and reassemble. Surface installations can have the insert installed manually.

Those skilled in the art will gain a better understanding of the present invention from a review of the description of the preferred embodiment and the associated drawings that appear below with the understanding that the full scope of the invention is determined by the appended claims.

SUMMARY OF THE INVENTION

An insert meter can be run into an inverse venturi on wireline and make use of the existing pressure taps to allow accurate measurement of reduced flow rates that could not be accurately measured with the inverse venturi meter. The insert meter has seals and can lock into position with peripheral sealing to direct the new and lower flow rate into the throat of the insert meter that is preferably a standard venturi. The venturi devices can be in meter or eductor service and located downhole, subsea or on the surface.

DETAILED DESCRIPTION OF THE PREFERRED EMBODIMENT

Figure 1:
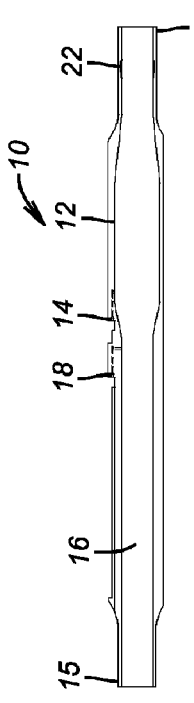
FIG. 1 is an inverse venturi that is installed in a string.

FIG. 1 illustrates an inverse venturi 10 of a type that is known in the art. It has an enlarged portion 12 with a pressure tap 14, the second tap. On the inlet end 15 there is a long inlet passage 16 of a predetermined size with an associated pressure tap 18, the first tap, which is disposed at the end of a passage 20 that leads from the inlet passage 16. In the known way, the pressure differential reading from taps 14 and 18 is used in the Bernoulli equation for flow computation.

Figure 2:
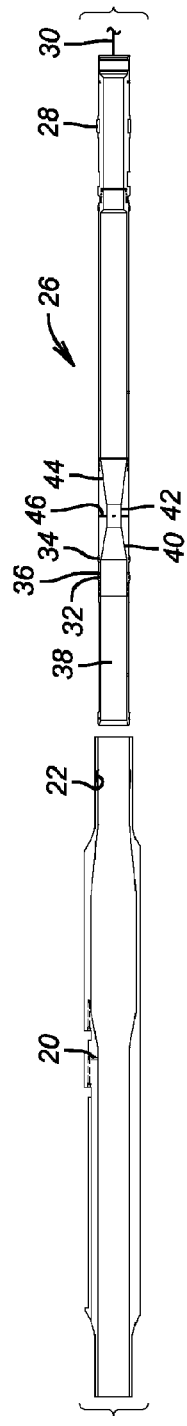
FIG. 2 is the view of FIG. 1 showing the insert meter being brought into position adjacent the inverse venturi of FIG. 1.
Figure 3:
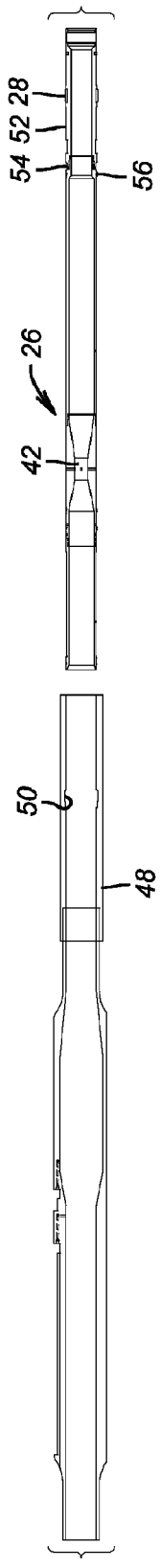
FIG. 3 is the view of FIG. 2 but an alternate embodiment where a separate nipple with a profile is attached to the inverse venturi to accept the insert meter.
Figure 4:
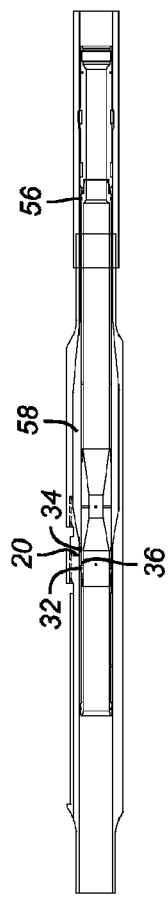
FIG. 4 is the view of FIG. 3 with the insert meter fully installed.

Schematically illustrated at the uphole end 24 is a profile 22 for stopping and securing the insert flow meter 26 using collets or equivalent latching or engagement structures 28. Locking is also contemplated by the schematic representation of item 28. The meter 26 can be selectively held in location within venturi 10 until it needs to be removed for any reason. As shown in FIG. 2 the preferred delivery mode of the insert meter 26 is with a wireline 30 that is schematically illustrated to stand in for alternative conveyances such as coiled tubing or even rigid tubing. The insert meter 26 has a pair of spaced seals 32 and 34 that straddle an opening or tap 36, the third tap, which leads from the inlet 38 and communicates with passage 20. A standard venturi has an inlet taper 40 followed by a throat 42 and then an outlet taper 44 in the direction of flow. Throat 42 has a pressure tap 46, the fourth tap, which will communicate with passage 14 when the insert meter 26 is latched at 22. In an alternative embodiment shown in FIG. 3 an optional separate nipple 48 can be used with the latch location 50 located within so that the extension nipple 52 now attached to the uphole end 54 will still place the throat 42 in the proper location with respect to tap 14 as shown in FIG. 4. Seal 56 engages the venturi 10 to seal off annular space 58 which extends to seal 34 when the meter 26 is fully installed as shown in FIG. 4. In the assembled position of FIG. 4 external seals 32 and 34 with port 36 between them allow fluid communication to passage 20 that is now isolated by seals 32 and 34. Tap 46 is now in annular space 58 that is sealed at opposed ends with seals 34 and 56. The wireline 30 has a known release that will allow disconnection from insert meter 26 after its latch assembly or equivalent 28 engages the latch location 22 or 50 depending on the embodiment employed.

Those skilled in the art will appreciate the insert meter 26 can be of a different type than a standard venturi and could in some applications be a smaller inverse venturi than the original meter for measuring smaller flow rates. While starting with an inverse venturi meter allows more room for the insert to be delivered into it other combinations of meter into meter are possible. The original and insert meter can be the same type or different types. Delivery vehicles can be varied to include wireline or electric line, coiled or rigid tubing. Using existing pressure taps from the original meter to operate the insert is preferred but not required. The normal and accurate operating flow range of meter 26 does not overlap with the much higher operating flow measurement range of the larger meter 10.

The concept of the insert 26 is not limited to metering applications or to a downhole location, as subsea or surface locations are possible in applications not limited to metering. Venturi devices can be used to enhance flow in a line when used as eductors such as in gas lift applications, where there is a reduced pressure created at the throat to enhance flow from low pressure formations. The installation technique for the insert 26 varies with location of the original device such as the inverse venturi 10, to name one example. When the application is an eductor the insert 26 will have a flow line at throat 42 rather than a pressure tap 46 while alignment with the former flow line from the original venturi 10 that will be there instead of the pressure tap 14.

The above description is illustrative of the preferred embodiment and many modifications may be made by those skilled in the art without departing from the invention whose scope is to be determined from the literal and equivalent scope of the claims below:

We claim:

1. A flow measurement system for surface subsea or subterranean use in a tubular string, comprising:
   an initial device for use as a flow meter mounted in said string;
   a subsequent device for use as a flow meter installed into said initial device for subsequent flow measurement.

2. The system of claim 1, wherein:
   said initial device comprises an initial venturi that has a plurality of sensing locations for
   computing flow and said subsequent device comprises a subsequent venturi that communicates to said sensing locations of said initial venturi.

3. The system of claim 1, wherein:
   said initial device is an inverse venturi meter.

4. The system of claim 1, wherein:
   said subsequent device is a standard venturi meter.

5. The system of claim 4, wherein:
   said subsequent device is capable of measuring flow rates in a non-overlapping range than said initial device.

6. The system of claim 5, wherein:
   said measurement range of said subsequent device is smaller than the measurement range of said initial device.

7. The system of claim 3, wherein:
   said subsequent device is a standard venturi meter.

8. The system of claim 1, further comprising:
   a delivery device for said subsequent device comprising one of wireline, coiled tubing and rigid tubing.

9. A flow measurement system for surface subsea or subterranean use in a tubular string, comprising:
   an initial device for use as a flow meter mounted in said string;
   a subsequent device for use as a flow meter installed into said initial device for subsequent flow measurement;
   said initial device comprises a latch location to accept and selectively retain said subsequent device.

10. The system of claim 9, wherein:
    said latch location is integral to said initial device or mounted to a nipple supported by said initial device.

11. A flow measurement system for surface subsea or subterranean use in a tubular string, comprising:
    an initial device for use as a flow meter mounted in said string;
    a subsequent device for use as a flow meter installed into said initial device for subsequent flow measurement;
    said initial device is an inverse venturi meter;
    said subsequent device is a standard venturi meter;
    said inverse venturi has a first and second spaced pressure taps;
    said standard venturi has a plurality of external seals that straddle said first and second pressure taps when said standard venturi is fully inserted into said inverse venturi.

12. The system of claim 11, wherein:
    said standard venturi has a third and fourth pressure taps with said seals separating said third and fourth taps.

13. The system of claim 12, wherein:
    said seals comprise three seals with a first and a second seal on opposed sides of said third tap and a third seal on the opposite side of said fourth tap from said second seal.

14. The system of claim 13, wherein:
    said first and second seals straddle said first pressure tap to sealingly communicate said third tap to said first tap when said subsequent venturi is fully inserted into said initial venturi.

15. The system of claim 14, wherein:
    said second and third seals straddle said second tap to sealingly communicate said fourth tap to said second tap when said subsequent venturi is fully inserted into said initial venturi.

16. The system of claim 15, wherein:
    said subsequent venturi has a throat and said fourth tap is located in said throat.

17. The system of claim 16, further comprising:
    a delivery device for said subsequent venturi comprising one of wireline, coiled tubing and rigid tubing.

18. The system of claim 16, wherein:
    said initial venturi comprises a latch location to accept and selectively retain said subsequent venturi.

19. The system of claim 18, wherein:
    said latch location is integral to said initial venturi or mounted to a nipple supported by said initial venturi.

20. The system of claim 10, wherein:
    said latch location allows said subsequent device to be locked to said initial device.

* * * * *